United States Patent
Kimura et al.

(10) Patent No.: US 9,531,178 B2
(45) Date of Patent: Dec. 27, 2016

(54) OVERHEAD WIRE TENSION BALANCER

(71) Applicant: NHK SPRING CO., LTD., Yokohama-shi, Kanagawa (JP)

(72) Inventors: Toru Kimura, Isehara (JP); Osamu Sasa, Isehara (JP)

(73) Assignee: NHK SPRING CO., LTD, Yokohama (JP)

( * ) Notice: Subject to any disclaimer, the term of this patent is extended or adjusted under 35 U.S.C. 154(b) by 65 days.

(21) Appl. No.: 14/405,297

(22) PCT Filed: Aug. 21, 2013

(86) PCT No.: PCT/JP2013/072261
§ 371 (c)(1),
(2) Date: Dec. 3, 2014

(87) PCT Pub. No.: WO2014/050374
PCT Pub. Date: Apr. 3, 2014

(65) Prior Publication Data
US 2015/0155693 A1    Jun. 4, 2015

(30) Foreign Application Priority Data
Sep. 25, 2012 (JP) .................................. 2012-210385

(51) Int. Cl.
*H02G 7/02* (2006.01)
*B60M 1/26* (2006.01)

(52) U.S. Cl.
CPC . *H02G 7/02* (2013.01); *B60M 1/26* (2013.01)

(58) Field of Classification Search
CPC .................................. H02G 7/02; B60M 1/26
USPC ..................................................... 174/40 TD
See application file for complete search history.

(56) References Cited

U.S. PATENT DOCUMENTS

| 1,222,480 | A | * | 4/1917 | Smith | F16F 3/04 267/70 |
| 2,128,030 | A | * | 8/1938 | Koleno | E04H 17/04 256/39 |
| 6,378,848 | B1 | * | 4/2002 | Uchida | B60M 1/26 267/64.25 |
| 6,439,552 | B1 | * | 8/2002 | Ageishi | B60M 1/26 188/379 |
| 8,267,356 | B2 | * | 9/2012 | Ohta | B60M 1/26 174/40 TD |

(Continued)

FOREIGN PATENT DOCUMENTS

| JP | A-9-207629 | 8/1997 |
| JP | A-11-48834 | 2/1999 |

*Primary Examiner* — William H Mayo, III
*Assistant Examiner* — Hiram E Gonzalez
(74) *Attorney, Agent, or Firm* — Oliff PLC (57) ABSTRACT

An overhead wire tension balancer can prevent rotation of an inner cylinder connected with an overhead wire, without deteriorating rotation preventing function, even if stroke is increased, and does not complicate production steps. A rotation preventing plate is formed at the inside of an inner cylinder, and an opening which cannot rotate relative to the rotation preventing plate and which can relatively move in a condition which passes a long plate, is formed on the rotation preventing plate. The long plate is formed by two long plate pieces in an L shape in which a tip is bent, a hanging portion is formed by this bent portion and prevents the rotation preventing plate from disengaging from the long plate.

5 Claims, 8 Drawing Sheets (56) References Cited

U.S. PATENT DOCUMENTS

2011/0089618 A1* 4/2011 Kimura .................... B60M 1/26
  267/73
2011/0253443 A1* 10/2011 Sasa ......................... B60M 1/26
  174/40 TD

* cited by examiner

OVERHEAD WIRE TENSION BALANCER

BACKGROUND OF THE INVENTION

Technical Field

The present invention relates to a technique for preventing rotation of an inner cylinder connected with an overhead wire in an overhead wire tension balancer in which tension is applied to the overhead wire for a train or a vehicle (a trolley bus, etc.).

Background Art

Patent Document 1 discloses an overhead wire tension balancer having a structure in which a slidable long plate is inserted into a guiding hole on a rotation preventing plate in a condition in which it cannot be rotated. Patent Document 2 discloses a locking structure in which a rigid portion (a stopper) for hanging on a circumference of a hole on an end surface of an inner cylinder is formed at a tip of a guiding plate (a pipe), so that a stroke does not exceed a fixed range.

Patent Document 1 is Japanese Unexamined Patent Application Publication No. Hei11-48834. Patent Document 2 is Japanese Unexamined Patent Application Publication No. Hei09-207629.

In the technique described in Patent Document 1, there is a problem in that the long plate may disengage from the rotation preventing plate, in a case in which the overhead wire tension balancer is pulled by the overhead wire, so as to increase the stroke. When the long plate disengages from the rotation preventing plate, a function that prevents rotation of the inner cylinder connected with the overhead wire is decreased. Furthermore, in the case in which the overhead wire tension balancer is decreased in size, the long plate does not return to an original condition.

Here, according to the structure having the stopper described in Patent Document 2, the long plate can be prevented from disengaging from the rotation preventing plate. However, the number of production steps and the production cost are increased by assembling the stopper.

In view of these circumstances, an object of the present invention is to provide an overhead wire tension balancer for applying tension to an overhead wire in which rotation of an inner cylinder connected with an overhead wire can be prevented, and a rotation preventing function will not deteriorate, even if stroke is increased, and moreover, increase in the number of production steps and production cost can be avoided.

DISCLOSURE OF THE INVENTION

A first aspect of the present invention has an overhead wire tension balancer having cylinders coaxially arranged comprising a long member that extends to the inside of the innermost cylinder of the cylinders, and a regulating member which is formed at the inside of the innermost cylinder of the cylinders, which moves the long member in a longitudinal direction, regulates rotation of the long member in which the longitudinal direction is a rotational axis, and engages with the long member in a condition which prevents the long member from completely pulling out from the inside of the innermost cylinder of the cylinders, wherein the long member is formed by members, each of these members has an engaging portion for engaging with the regulating member, and the long member is engaged with the regulating member by individually engaging.

According to the first aspect, since the long member is not rotated relative to the regulating member, the innermost cylinder is prevented from rotating. In addition, the above rotation preventing function is maintained, even if the stroke is increased, since the long member is engaged with the regulating member in a condition in which it can move in a longitudinal direction. Furthermore, because the long member cannot be completely pulled out from the regulating member, the inner cylinder will not detach from the long member, and the above rotation preventing function will not be deteriorated, even if the stroke becomes a maximum. Additionally, for example, the long member is engaged with the regulating member by sequentially engaging the divided long members with the opening of the regulating member, since the long member is made from members and these members are engaged with the regulating member. Therefore, the work is more simplified than the case in which the long member is not divided.

A second aspect of the present invention has an overhead wire tension balancer according to the first aspect of the present invention, in which the members are a first member and a second member in an L-shape of which a tip is bent. According to the second aspect of the present invention, for example, engaging of the long member with the regulating member is carried out by first engaging the L-shaped bent portion of the first member with the regulating member and by then engaging the L-shaped bent portion of the second member with the regulating member. In this case, troublesome tasks in conventional techniques are not required, in which for example, the long member is passed through the opening formed on the regulating member, then another member which is a stopper is mounted to a tip of the long member protruding from the regulating member, and the like.

A third aspect of the present invention has an overhead wire tension balancer according to the first aspect or the second aspect of the present invention, in which in a condition in which the long member is engaged with the regulating member, the long member is divided into members, and each engaging of these members with the regulating member is individually released. According to the third aspect of the present invention, the long member can be easily disassembled, and replacement of parts or maintenance is easily carried out.

A fourth aspect of the present invention has an overhead wire tension balancer according to the first aspect of the present invention, in which the engaging is carried out by elastic deformation of the members. According to the fourth aspect of the present invention, the engaging is carried out by the elastic deformation of the members that constitute the long member. For example, the flange portion is inserted in the opening formed on the regulating portion by forming the flange portion on each of the members that constitute the long member and by elastically deforming the members. Then, the flange portion is hanged at an edge of the opening by returning the elastically deformed condition to the original condition. Therefore, the work in which the long member is engaged with the regulating member can be carried out. This work is easier than the case for mounting another member that is a stopper.

A fifth aspect of the present invention has an overhead wire tension balancer according to any one of the first aspect to the fourth aspect of the present invention, in which the long member can be telescoped. According to the fifth aspect of the present invention, since the long member can be extended, the function that prevents the rotating of the inner cylinder can be maintained and the stroke for transferring the inner cylinder relative to the outer cylinder can be ensured.

According to the present invention, in an overhead wire tension balancer for applying tension to an overhead wire, rotation of an inner cylinder connected with an overhead wire can be prevented, and a rotation preventing function cannot be deteriorated, even if stroke is increased, and moreover, production steps and production cost can be prevented from increasing.

EXPLANATION OF REFERENCE NUMERALS

Reference numeral 100 denotes an overhead wire tension balancer, 101 denotes an outer cylinder, 102 denotes a suspending member mounting portion, 103 denotes a spring contacting portion, 104 denotes a middle cylinder, 105 denotes an outer coiled spring, 106 denotes a spring contacting portion, 107 denotes a spring contacting portion, 108 denotes an inner cylinder, 109 denotes an inner coiled spring, 110 denotes a spring contacting portion, 111 denotes a cover member, 112 denotes an overhead wire mounting portion, 113 denotes a rotation preventing plate, 114 denotes an opening, 115 denotes a long plate, 115*a* denotes a hanging portion, 116 denotes a long plate piece, 116*a* denotes a bended portion, 117 denotes a long plate piece, 117*a* denotes a bent portion, 118 denotes a bolt hole, 119 denotes a bolt, 120 denotes a pillar mounting portion, 121 denotes a U-shaped bolt, 122 denotes a closing plate, 130 denotes a telescopic plate, 130*a* denotes a hanging portion, 140 denotes a long plate, 141 denotes a long hole, 142 denotes a bolt hole, 150 denotes a long plate piece, 151 denotes a bolt hole, 150*a* denotes a bending portion, 160 denotes a long plate piece, 161 denotes a bolt hole, 160*a* denotes a bending portion, 170 denotes a bolt, 171 denotes a nut, 200 denotes a telescopic plate, 210 denotes a long plate, 220 denotes a long plate piece, 220*a* denotes a flange portion, 220*b* denotes a slope portion, 220*c* denotes a gap portion, 230 denotes a long plate piece, 230*a* denotes a flange portion, 251 denotes a bolt, and 252 denotes a nut.

MODE FOR CARRYING OUT THE INVENTION

1. First Embodiment

Structure

Figure 1:
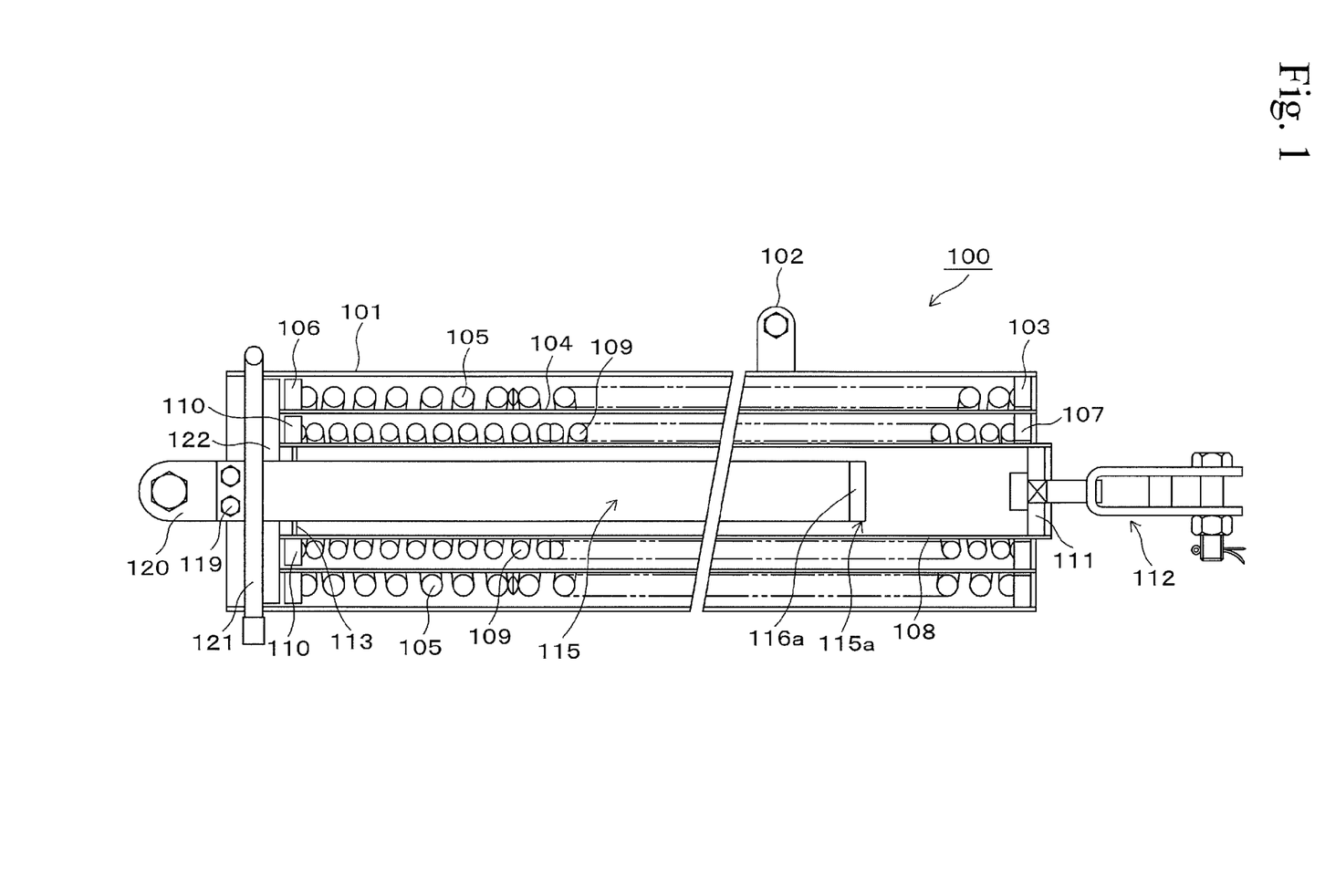
FIG. 1 is a cross sectional side view showing an overhead wire tension balancer according to an embodiment of the present invention.

FIG. 1 shows a cross sectional structure of an overhead wire tension balancer 100. The overhead wire tension balancer 100 has three cylindrical members that are coaxially arranged. First, the overhead wire tension balancer 100 has an outer cylinder 101 that is the outermost cylindrical member. A suspending member mounting portion 102 to which a suspending member for supporting from a pillar (not shown) is connected, is formed on the outside of the outer cylinder 101. A spring contacting portion 103 in a ring shape is formed on the inside of one edge in an axial direction (a right side of the figure) of the outer cylinder 101. The spring contacting portion 103 has a structure in which a protruded strip protruded toward an axial center is arranged in a ring shape. Other spring contacting portions have also the same structure. On the inside of the outer cylinder 101, a middle cylinder 104 which is a cylindrical member arranged at a middle portion is coaxially contained. The middle cylinder 104 has an approximately cylindrical shape.

Between the middle cylinder 104 and the outer cylinder 101, an outer coiled spring 105 is placed. The outer coiled spring 105 is divided in an axial direction into multiple parts. Of course, it may have a structure in which the outer coiled spring 105 is not divided. Other coiled springs also have the same structure. One edge (a right side of the figure) of the outer coiled spring 105 is contacted with the spring contacting portion 103 on the inside of the outer cylinder 101, and the other edge (a left side of the figure) of the outer coiled spring 105 is contacted with the spring contacting portion 106 in a ring shape formed on the other edge of the middle cylinder 104. In a condition in which tension is not applied from an overhead wire (not shown), that is, a condition in which the below inner cylinder 108 is not pulled to a right side of the figure, the outer coiled spring 105 is compressed to be a condition which can be further compressed. Other coiled springs also have the same structure. On the inside of one edge of the middle cylinder 104, a spring contacting portion 107 in a ring shape is formed.

On the inside of the middle cylinder 104, an inner cylinder 108, which is a cylindrical member arranged at the innermost, is coaxially contained. Between the middle cylinder 104 and the inner cylinder 108, an inner coiled spring 109 is placed. One edge of the inner coiled spring 109 is contacted with the spring contacting portion 107 at the inside of the middle cylinder 104, and the other edge of the inner coiled spring 109 is contacted with a spring contacting portion 110 in a ring shape formed on the outside of one edge of the inner cylinder 108.

Figure 2:
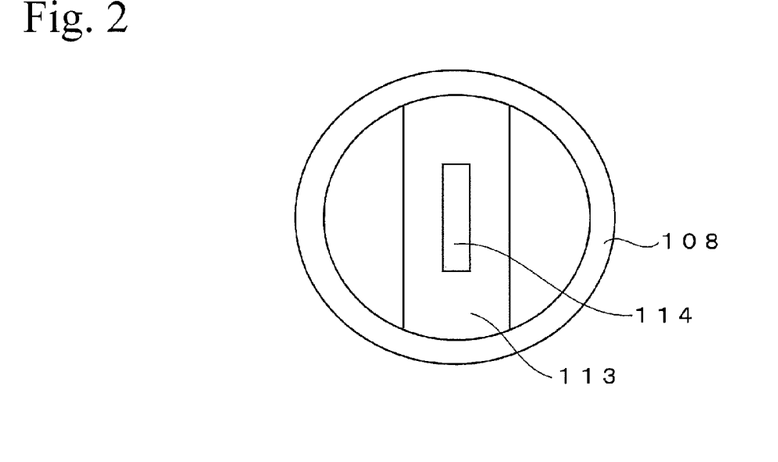
FIG. 2 is a cross sectional view showing an inner cylinder viewed from an axial direction.

On the other edge of the inner cylinder 108, a cover member 111 is attached, and an overhead wire mounting portion 112 is fixed to the cover member 111. An overhead wire (not shown), which extends in a right and left direction in the figure, is connected with the overhead wire mounting portion 112. The overhead wire includes an overhead wire for supplying electric power, an overhead wire for transmitting various signals, and a guide wire for guiding or pulling the wire. On the inside of the other edge of the inner cylinder 108, a rotation preventing plate 113, which is an example of a regulating member, is attached. The rotation preventing plate 113 is shown in FIG. 2. A rectangular opening 114 is formed at the center of the rotation preventing plate 113.

Figure 3A:
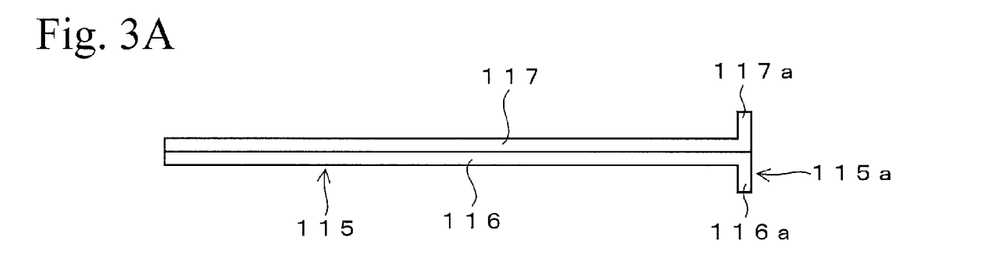
FIG. 3A is a top view of a long plate.
Figure 3B:
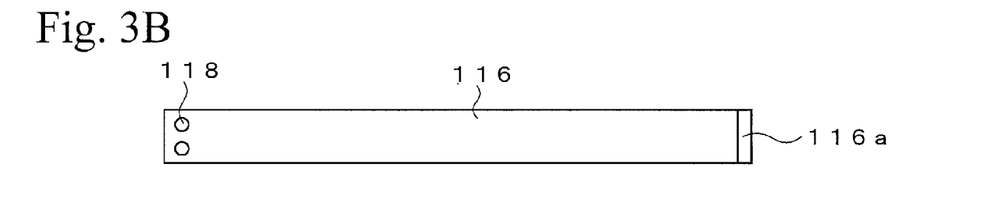
FIG. 3B is a side view of the long plate.
Figure 3C:
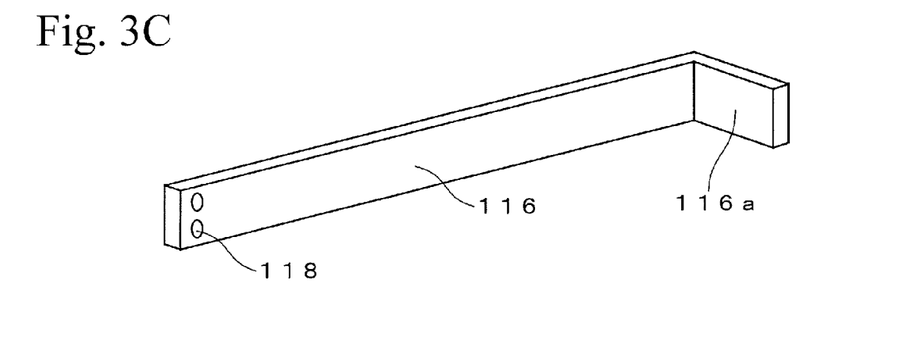
FIG. 3C is a perspective view of a long plate piece.

Referring again to FIG. 1, on the inside of the inner cylinder 108, a long plate 115, which is an example of a long member, is contained. The long plate 115 is shown in FIG. 3. The long plate 115 is constructed of long plate pieces 116 and 117. The long plate pieces 116 and 117 are the same, and they have an approximately L-shaped structure in which bending portions 116a and 117a are formed by bending one edge of a narrow metal plate at a right angle. The long plate 115 is formed by contacting the long plate pieces 116 and 117 back to back.

The long plate 115 is slidably contained in the opening 114 of the rotation preventing plate 113. At one edge of the long plate 115, a hanging portion 115a in a key shape in which the bending portions 116a and 117a open right and left viewed from a vertical direction in the figure, is formed. The hanging portion 115a is formed by the bending portions 116a and 117a. At the other edge of the long plate 115, bolt holes 118 are formed. The other edge of the long plate 115 is fixed to a pillar mounting portion 120 by bolts 119 through the bolt holes 118. The pillar mounting portion 120 is fixed to a closing plate 122 attached to the inside of the outer cylinder 101. The pillar mounting portion 120 is a member for fixing an edge of the overhead wire tension balancer 100 to a pillar (a concrete pillar or a metallic pillar), not shown. Of course, the overhead wire tension balancer 100 can be fixed to not only the pillar, but also to various adequate structural materials. Reference numeral 121 in FIG. 1 denotes a U-shaped bolt (a U shape viewed from an axial direction) in which each member is contained in the inside of the outer cylinder 101, so that it does not protrude to the outside of an axial direction (a left side of FIG. 1), and when tension is applied from the overhead wire, it is transmitted to the closing plate 122.

Assembly

Figure 5:
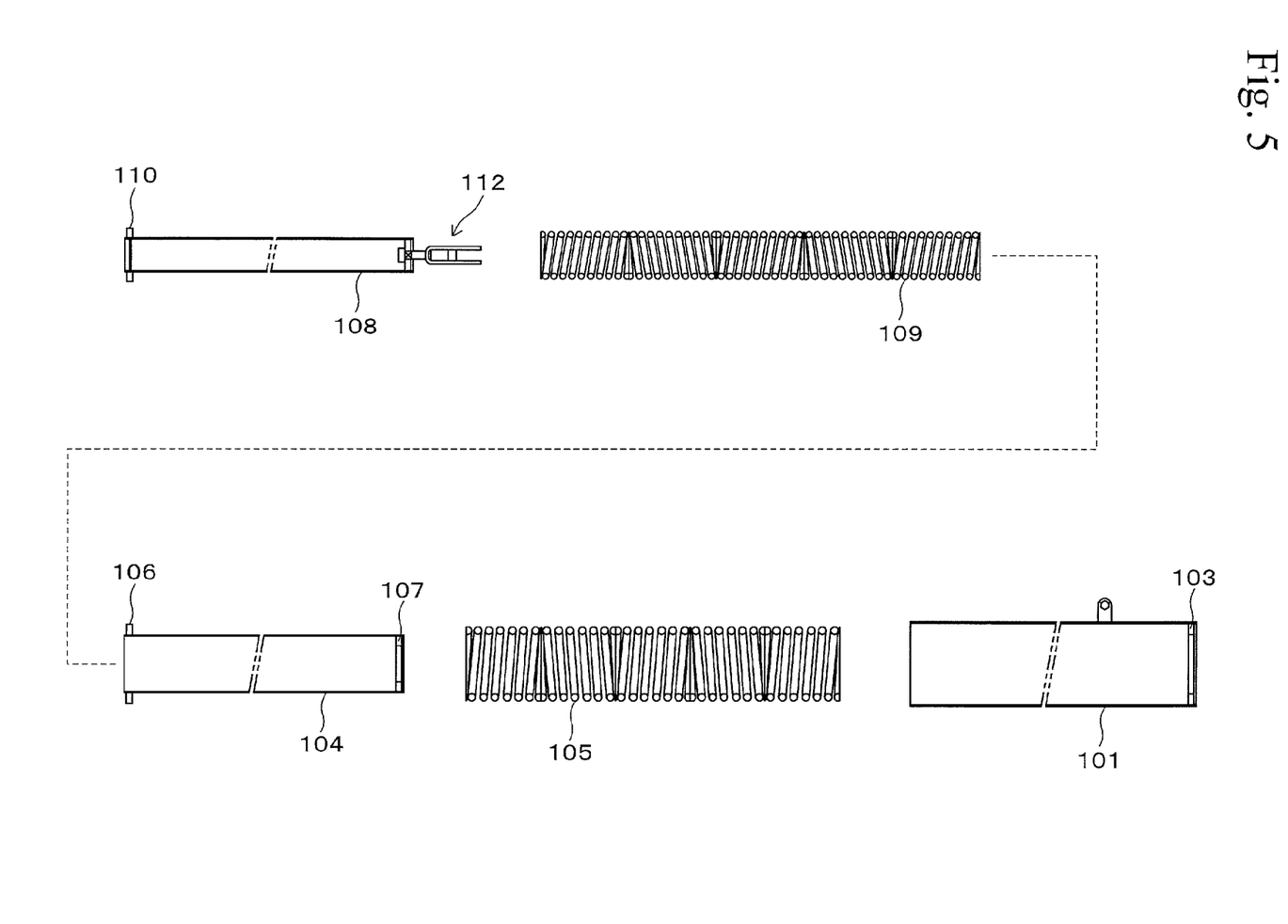
FIG. 5 is a schematic diagram showing assembling steps of the overhead wire tension balancer according to an embodiment of the present invention.

FIG. 5 shows a condition in which an outer cylinder 101, an outer coiled spring 105, a middle cylinder 104, an inner coiled spring 109 and an inner cylinder 108 are separated and arranged in an axial direction. The overhead wire tension balancer 100 shown in FIG. 1 is assembled according to the following steps. First, the outer coiled spring 105 is contained in the outer cylinder 101. In this case, a part (a right side of the figure) of the outer coiled spring 105 is contacted with the spring contacting portion 103. Next, the middle cylinder 104 is inserted in the inside of the outer coiled spring 105, and the other edge (a left side of the figure) of the outer coiled spring 105 is contacted with the spring contacting portion 106. Next, the inner coiled spring 109 is inserted in the inside of the middle cylinder 104, and a part (a right side of the figure) of the inner coiled spring 109 is contacted with the spring contacting portion 107. Finally, the inner cylinder 108 is inserted in the inside of the inner coiled spring 109, and the other edge (a left side of the figure) of the inner coiled spring 109 is contacted with the spring contacting portion 110.

Figure 4A:
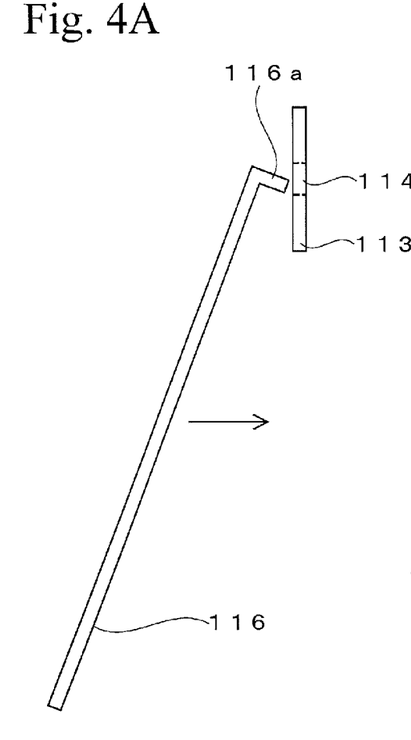
FIG. 4 is a schematic diagram showing hanging steps of long plate pieces on a rotation preventing plate.
Figure 4B:
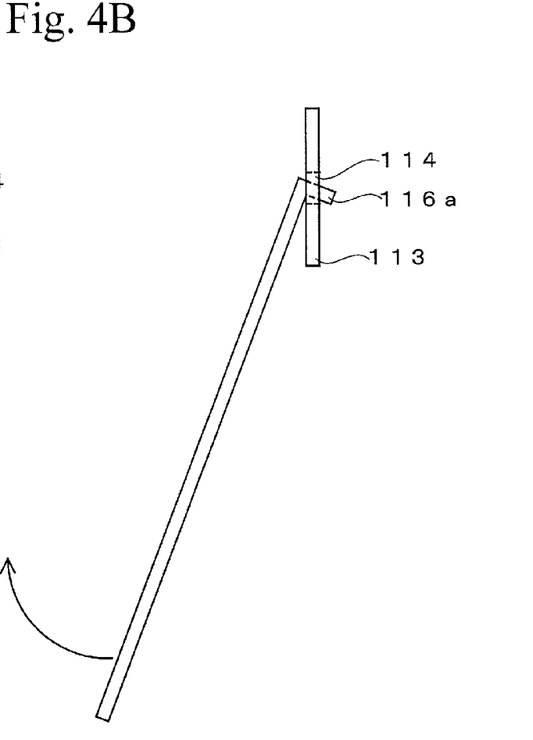
Figure 4C:
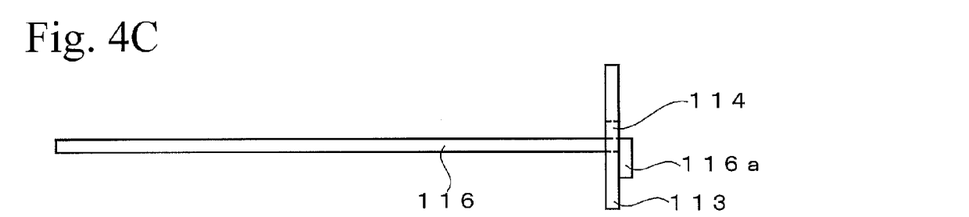

In this condition, the long plate pieces 116 and 117 are inserted from the other edge (a left side of the figure) of the inner cylinder 108 into the inside of the inner cylinder 108, and the inner cylinder 108 is engaged with a long plate 115 (which is not shown in FIG. 5). In the following, this step will be explained with reference to FIG. 4. Here, a step in which the long plate piece 116 is engaged with the rotation preventing plate 113 of the inner cylinder 108 is explained. First, the long plate piece 116 is closed to the preventing portion 113 in a condition shown in FIG. 4A, and the bending portion 116a is inserted in the opening 114. In this way, a condition shown in FIG. 4B is obtained. Next, the bending portion 116a is set to be a fulcrum, the long plate piece 116 is rotated in a clockwise direction in the figure, and a condition shown in FIG. 4C is obtained. Then, the other long plate piece 117 is engaged with the opening 114 in the same manner. In this way, a condition shown in FIG. 4D is obtained, and a condition in which the long plate 115 is engaged with the rotation preventing plate 113 is obtained.

In this condition, the long plate 115 can be moved in a right direction in the figure relative to the rotation preventing plate 113. Here, the opening 114 shown in FIG. 2 is a rectangle and a cross-sectional shape of the long plate 115 is also a rectangle. Therefore, the long plate 115 can slide in the inside of the opening 114, and the long plate 115 is prevented from rotating relative to the rotation preventing plate 113 (the inner cylinder 108). That is, the rotation preventing plate 113 (the inner cylinder 108) can be moved to a left direction of FIG. 4 relative to the long plate 115, in a condition in which the rotation preventing plate 113 (the inner cylinder 108) can be rotated relative to the long plate 115. In addition, the long plate 115 cannot be moved in a left direction in the figure in a condition shown in FIG. 4D, since a hanging portion 115a is engaged with a right surface of the rotation preventing plate 113. In other words, the rotation preventing plate 113 cannot be moved in a right direction in FIG. 4 relative to the long plate 115, since the hanging portion 115a is engaged with a right surface of the rotation preventing plate 113 in a condition shown in FIG. 4D.

Figure 4D:
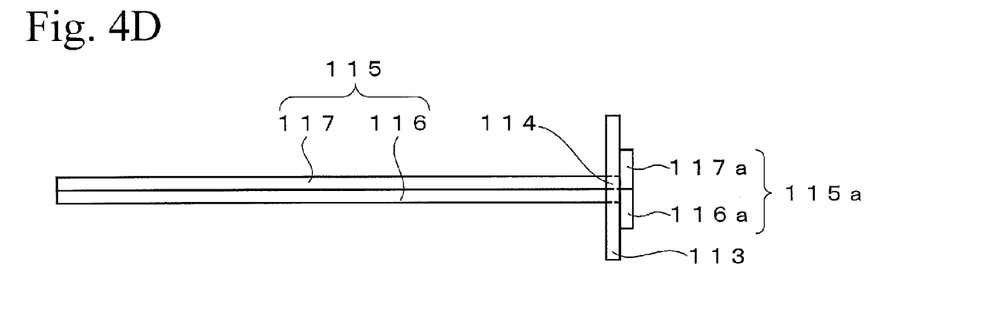

Here, the long plate pieces 116 and 117 can be individually detached from a condition shown in FIG. 4D by carrying out the above procedure in reverse. That is, engaging of the long plate pieces 116 and 117 with the rotation preventing plate 113 can be released by carrying out the above procedure in reverse from the condition shown in FIG. 4D.

Figure 6:
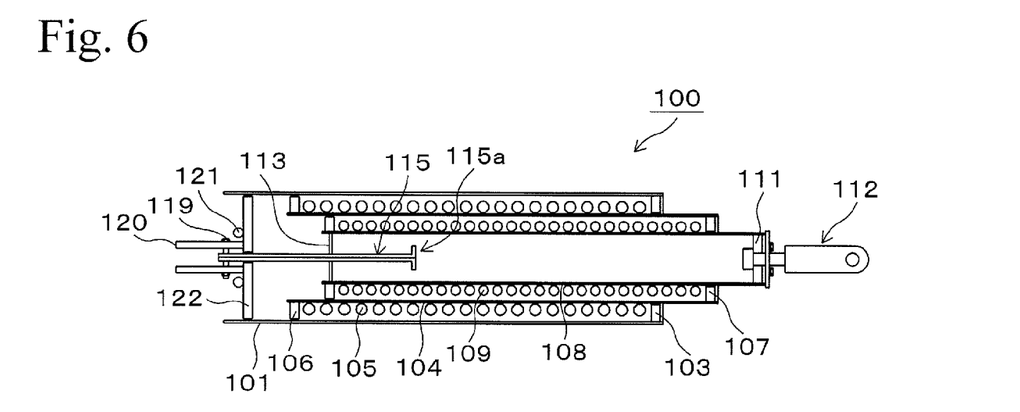
FIG. 6 is a cross sectional side view showing a use condition of the overhead wire tension balancer according to an embodiment of the present invention.

After the long plate 115 is engaged with the inner cylinder 108, a traction wire is mounted to the overhead wire mounting portion 112, the wire is pulled from an opening on the other edge (a right side of the figure) of the outer cylinder 101, and the inner cylinder 108 is pulled in a right direction in FIG. 5 by a winch. In this case, the outer coiled spring 105 and the inner coiled spring 109 are compressed and decreased in size in an axial direction. In this condition, the closing plate 122 in a circular shape having an opening in which the long plate 115 is passed through the inside of the outer cylinder 101 is attached (see FIGS. 1 and 6), a U-shaped bolt 121 for fixing is inserted in a bolt hole (not shown) formed on the outer cylinder 101, and the outside (a left side of the figure) of the closing plate 122 is pressed by the U-shaped bolt 121 (see FIG. 6). Furthermore, a pillar mounting portion 120 is attached to the long plate 115 by a bolt 119, and a condition shown in FIG. 6 is obtained. Here, FIG. 6 shows a condition viewed at an angle 90 degrees different from that shown in FIG. 1.

Operation

In the condition shown in FIG. 1, the pillar mounting portion 120 is fixed to a concrete pillar (not shown), etc., and the overhead wire (not shown) is mounted on the overhead wire mounting portion 112. In this condition, the overhead wire mounting portion 112 is pulled in a right direction of FIG. 1 by an overhead wire (not shown), and when the inner cylinder 108 is pulled in a right direction in the figure, the outer coiled spring 105 and the inner coiled spring 109 are decreased in size, and the middle cylinder 104 and the inner cylinder 108 are moved in a right direction in the figure. This condition is shown in FIG. 6.

In this case, the long plate 115 is inserted in the rectangular opening 114 in a slidable condition (a condition in which it can be removed and inserted), a cross-sectional structure of the rectangular shape of the long plate 115 has a shape which corresponds to that of the opening 114 and the other edge (a left end portion of FIGS. 1 and 6) of the long plate 115 is fixed to a pillar (not shown) through the pillar mounting portion 120. Therefore, when the above overhead wire mounting portion 112 is moved in an axial direction, rotation of the inner cylinder 108 (the overhead wire mounting portion 112) is prevented. In addition, when the overhead wires mounting portion 112 is moved in a right direction in the figure by a given length, the inner cylinder 108 is prevented from moving in a right direction in the figure over the given length by contacting the hanging portion 115a with a surface at a right side of the figure of the rotation preventing plate 113.

The pillar mounting portion 120 is fixed to a pillar such as a concrete pillar, etc., in a condition as shown in FIG. 6. Here, when the overhead wire mounting portion 112 is pulled in a right direction in the figure, force generated by pulling is applied to the outer cylinder 101 through the inner coiled spring 109 and the outside coiled spring 105. This force is applied from the U-shaped bolt 121 to a closing plate 122, whereby the closing plate 122 is pressed in a right direction in the figure. The pillar mounting portion 120 is fixed to the closing plate 122, and as a result, the force that pulls the overhead wire mounting portion 112 in a right direction in the figure is supported through the pillar mounting portion 120 by the pillar (not shown). In addition, the long plate 115 is fixed to the pillar mounting portion 120, and therefore, the inner cylinder 108 which cannot be rotated relative to the long plate 115 is not rotated relative to a fixed object (in this case, a pillar, not shown).

Advantages

As described above, the rotation preventing plate 113 is formed on the inside of the inner cylinder 108, and the opening 114 which can be relatively moved in a condition which cannot be rotated relative to the rotation preventing plate 113 and a condition in which the long plate 115 is passed through, is formed on the rotation preventing plate 113. The long plate 115 is formed by two long plate pieces 116 and 117 in a L-shape of which the tip is bent, and this bent portion functions as a hanging portion 115a, so that the rotation preventing plate 113 is prevented from falling from the long plate 115. Here, since the two long plate pieces 116 and 117 can be individually engaged with the rotation preventing plate 113, a production method thereof is simplified.

That is, the rotation of the long plate 115 (see FIG. 3) passed through the opening 114 (see FIG. 2) in a condition which can be moved in an axial direction is controlled by the opening 114, and therefore, the rotation of the inner cylinder 108 relative to the outer cylinder 101 (see FIG. 1) is prevented. In addition, as is apparent from FIG. 6, when the inner cylinder 108 is pulled in a right direction in the figure by a given length, the inner cylinder 108 is prevented from pulling by contacting the rotation preventing plate 113 with the hanging portion 115a, which is a stopper. Therefore, the rotation preventing function is decreased and a stopper structure in which pulling of the inner cylinder 108 is physically limited, is realized, even if the stroke is increased. Furthermore, since the long plate 115 can be engaged with the rotation preventing plate 113 may by simple steps as shown in FIG. 4, the production steps and the production cost are prevented from increasing.

2. Second Embodiment

Structure

The present embodiment is an example having a structure in which the long plate 115 in the first embodiment can be telescoped. In the following, the structure in which the long plate can be telescoped will be mainly explained, since portions other than the long plate are the same as those in the first embodiment. FIG. 7 shows a cross sectional view of an overhead wire tension balancer 200 viewed from a top direction. FIG. 7 shows a stepwise process in which the stroke is gradually increased by pulling the inner cylinder 108 in a right direction in the figure, as the process proceeds from a step shown in FIG. 4A to a step shown in FIG. 4C.

The overhead wire tension balancer 200 shown in FIG. 7 has a telescopic plate 130. The telescopic plate 130 has a hanging portion 130a having the same structure as that of the hanging portion 115a shown in FIG. 1. When the inner cylinder 108 is moved by a given length in a right direction in the figure as shown in FIG. 7, the hanging portion 130a is contacted with the rotation preventing plate 113 and the telescopic plate 130 is extended.

Figure 7A:
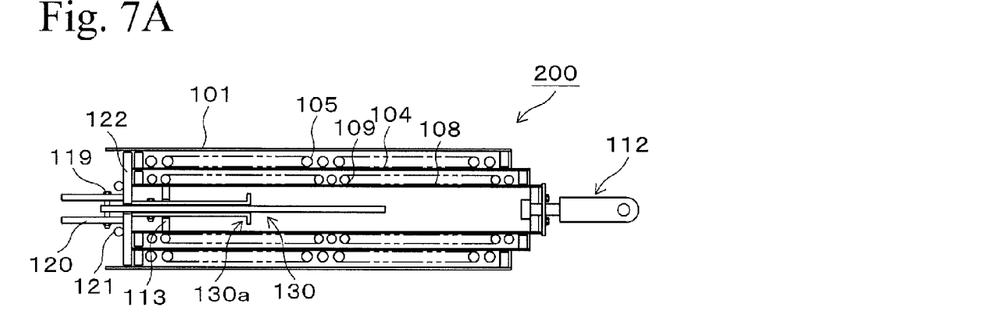
FIG. 7 is a cross sectional side view showing a using condition of the overhead wire tension balancer according to another embodiment of the present invention.
Figure 7B:
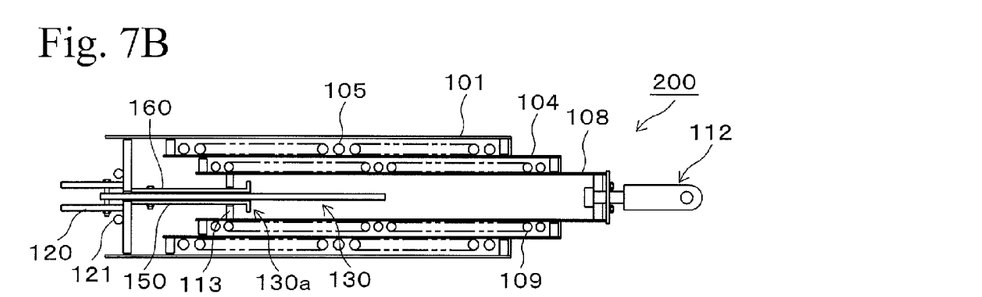
Figure 7C:
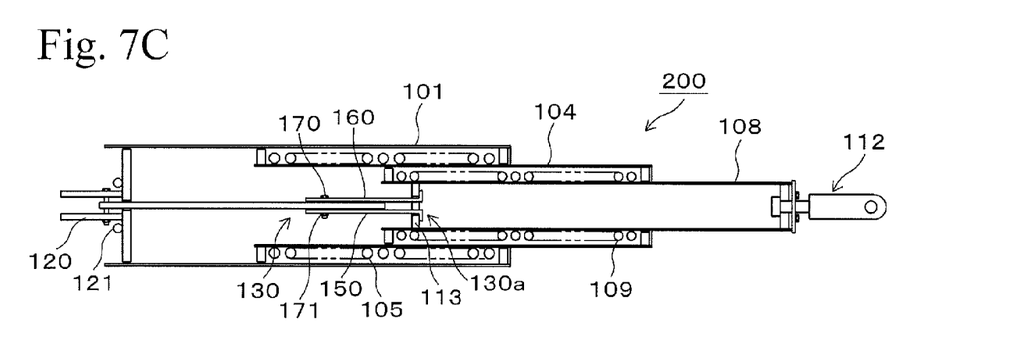
Figure 8:
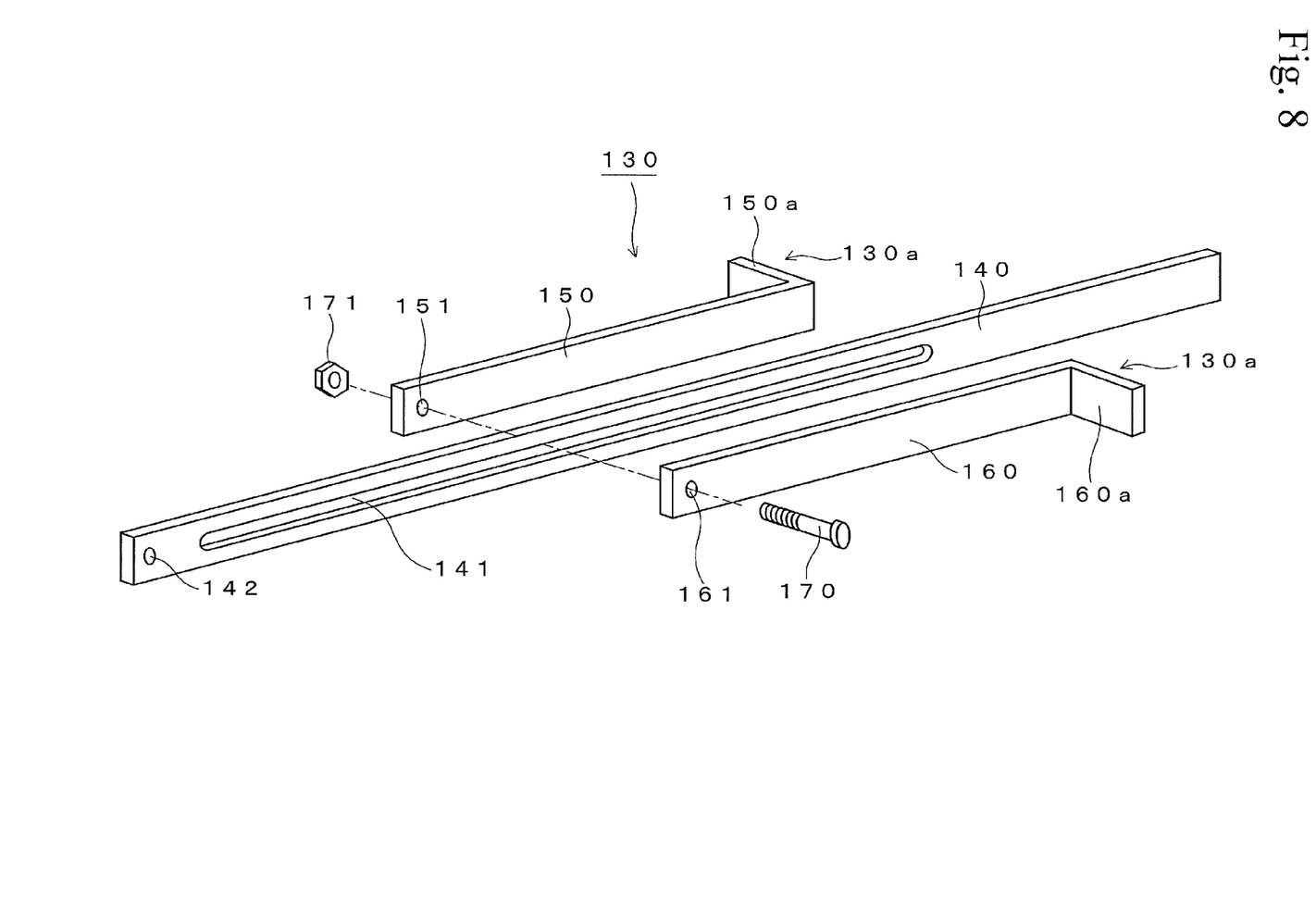
FIG. 8 is an exploded perspective view of a telescopic plate.

FIG. 8 shows an exploded perspective view of the telescopic plate 130. The telescopic plate 130 has a long plate 140 and long plate pieces 150 and 160. The long plate 140 is longer than the long plate pieces 150 and 160, and a long hole 141, which extends in a longitudinal direction, is formed. A bolt hole 142 is formed on the other edge of the long plate 140, and the long plate 140 (the telescopic plate 130) is fixed to pillar mounting portion 120 (see FIG. 7) using the bolt hole 142.

The long plate pieces 150 and 160 have a structure that is essentially the same as those of the long plate pieces 116 and 117 shown in FIG. 3, and bending portions 150a and 160a are formed on one edge thereof. By these bending portions 150a and 160a, the hanging portion 130a is formed. A bolt hole 151 is formed on the long plate piece 150, and a bolt hole 161 is formed on the long plate piece 160. The long plate 140 is sandwiched by the long plate pieces 150 and 160 in a condition shown in the figure, and the telescopic plate 130 is assembled by passing a bolt 170 through the bolt hole 151, the long hole 141 and the bolt hole 161 and fixing the bolt 170 with a nut 171. Here, the bolt 170 can be moved in an extending direction in the long hole 141, and the bolt 170 and the nut 171 are fixed, so that the long plate pieces 150 and 160 can be moved in an extending direction of the long hole 141 relative to the long plate 140 in a condition assembled as a telescopic plate 130.

In also this embodiment, the rotation preventing plate 113 shown in FIG. 2 is arranged on the inside of the other edge of the inner cylinder 108, and the telescopic plate 130 is passed through the opening 114 on the rotation preventing plate 113. Here, the rotation preventing plate 113 can be moved in a right and left direction of FIG. 7 relative to the telescopic plate 130, and rotation relative to the telescopic plate 130, in which this moving direction is a rotation axis, can be prevented by the rotation preventing plate 113.

Assembly

The assembly of the telescopic plate 130 will be explained. First, the long plate pieces 150 and 160 are passed through the opening 114 by the same method as that shown in FIG. 4. Next, in a condition in which the long plate 140 is sandwiched between the long plate pieces 150 and 160, the bolt 170 is passed through the bolt hole 151, the long hole 141 and the bolt hole 161, and the bolt 170 is fixed with the nut 171. In this way, the telescopic plate 130 is assembled, and it is combined with the overhead wire tension balancer 200. Other assembly steps with respect to the overhead wire tension balancer 200 are the same as those of the overhead wire tension balancer 100 shown in FIG. 1.

Operation

In a condition shown in FIG. 7A, the pillar mounting portion 120 is fixed to a concrete pillar (not shown), etc., and an overhead wire (not shown) is mounted on the overhead wire mounting portion 112. In this condition, when the overhead wire mounting portion 112 is pulled by an overhead wire (not shown) in a right direction of FIG. 7 and the inner cylinder 108 is pulled in a right direction in the figure, the outer coiled spring 105 and the inner coiled spring 109 are decreased in size and the middle cylinder 104 and the inner cylinder 108 are moved in a right direction in the figure.

In this case, the telescopic plate 130 is inserted in the opening 114 in a rectangular shape (see FIG. 2) in a slidable condition (a condition in which it can be removed and inserted), a cross sectional structure in a rectangular shape of the telescopic plate 130 corresponds to a shape of the opening 114, and the other edge (a left edge portion) of the telescopic plate 130 is fixed to a pillar (not shown) by way of the pillar mounting portion 120. Therefore, when the above overhead wire mounting portion 112 is moved to a right direction in the figure, the inner cylinder 108 (the overhead wire mounting portion 112) is prevented from rotating. In addition, when the overhead wire mounting portion 112 is moved to a right direction in the figure by a given length, that is, after a condition shown in FIG. 7B, the hanging portion 130a is contacted with a surface at a right side of the figure of the rotation preventing plate 113. In this case, the long plate pieces 150 and 160 can be slid in a right direction in the figure relative to the long plate 140, since the bolt 170 can be slid in the long hole 141 shown in FIG. 8 and the hanging portion 130a can be further slid in a right direction of FIG. 7. That is, the hanging portion 130a is moved in a right direction in the figure with the rotation preventing plate 113, and the telescopic plate 130 is extended. This condition is shown in FIG. 7C. Then, a condition in which this extension is stopped is a breaking point (the maximum stroke condition) in which the rotation preventing plate 113 is contacted with the hanging portion 130a and the inner cylinder 108 cannot be further moved in a right direction in FIG. 6.

In a condition shown in FIG. 7C, when tension from the overhead wire is decreased and tensile force of the outer coiled spring 105 and the inner coiled spring 109 is increased, movement that is the reverse to that in the above case occurs and the middle cylinder 104 and the inner cylinder 108 are moved in a left direction in the figure. In this case, first, the rotation preventing plate 113 is slipped relative to the telescopic plate 130, and it is moved in a left direction in the figure from the hanging portion 130a. Then, when the rotation preventing plate 113 is further moved in a left direction, it is contacted with the bolt 170 and the nut 171. According to this contacting, the bolt 170 and the nut 171 are pushed in a left direction in the figure by the rotation preventing plate 113, the long plate pieces 150 and 160 are moved in a left direction in the figure, and the telescopic plate 130 is decreased in size. When the rotation preventing plate 113 is further moved in a left direction in the figure, the long plate pieces 150 and 160 are moved with it in a left direction in the figure, and finally, the middle cylinder 104 and the inner cylinder 108 can be prevented from further moving in a left direction in the figure, that is, the overhead wire tension balancer 200 is decreased in size to the maximal degree. Here, in actual use, the tension from the overhead wire and the tension in which the overhead wire tension balancer 200 pulls the overhead wire are balanced in a condition between the above maximum stroke and the minimum stroke.

Advantages

In the overhead wire tension balancer 200, a rotation stop function and a stopper function of the inner cylinder 108 can be maintained and the inner cylinder 108 can be pulled by extending the telescopic plate 130. That is, an overhead wire tension balancer corresponding to a long stroke can be obtained.

3. Third Embodiment

Structure

The present embodiment has a structure in which a long member with an engaging portion can be elastically deformed and the engaging portion can be engaged with a regulating portion by restoring elastic deformation and subsequent deformation. FIG. 9 shows a telescopic plate 200, which is an example of the long member. The telescopic plate 200 has a long plate 210 and long plate pieces 220 and 230. The long plate 210 is essentially the same member as the long plate 140 shown in FIG. 8. The same long hole as the long hole 141 shown in FIG. 8 is formed on a long plate 210 also, although it is not shown. On the long plate pieces 150 and 160 shown in FIG. 8, the long plate pieces 220 and 230 have flange portions 220a and 230a instead of the bending portions 150a and 160a. The flange portion 220a has a protruded structure including a slope portion 220b of which a tip is inclined and a gap portion 220c, and the gap portion 220c is engaged with an edge of the opening 114 on the rotation preventing plate 113, as well as the case of the bending portions 150a and 160a. The flange portion 230a also has the same structure.

In a condition in which the long plate 210 is sandwiched by the long plate pieces 220 and 230, the long plate 210 and the long plate pieces 220 and 230 are combined by a bolt 251 and a nut 252. Here, the bolt 251 is passed through the above long hole formed on the long plate 210 in a condition in which it can be slid in a longitudinal direction thereof, and the long plate pieces 220 and 230 can be slid relative to the long plate 210 as well as in the case of FIG. 8.

The long plate pieces 220 and 230 are formed by processing a metal plate that can be bent by elastic deformation. In the present embodiment, dimensions of each portion are adjusted in conditions in which the long plate pieces 220 and 230 are slid to a left side of the figure to the maximal degree relative to the long plate 210, so as to be in a condition shown in FIG. 9A. In this condition, the flange portions 220a and 230a are separated by a thickness of the long plate 210. In addition, in viewing from the front (a right direction of the figure), each dimension is adjusted, so that distance L1 between outer edges of the flange portions 220a and 230a is greater than dimension L2 of a portion corresponding to the opening 114 and total thickness L3 of the long plate 210 and the long plate pieces 220 and 230 is less than the dimension L2. When tips of the flange portions 220a and 230a are contacted with the opening 114 and the long plate pieces 220 and 230 are bent as shown in FIG. 9B, each dimension is adjusted, so that diameter dimension L4 of the flange portions 220a and 230a is less than the dimension L2 of a portion corresponding to the opening 114 and the flange portions 220a and 230a are passed through the inside of the opening 114 in a condition shown in FIG. 9B.

Assembly

Figure 9A:
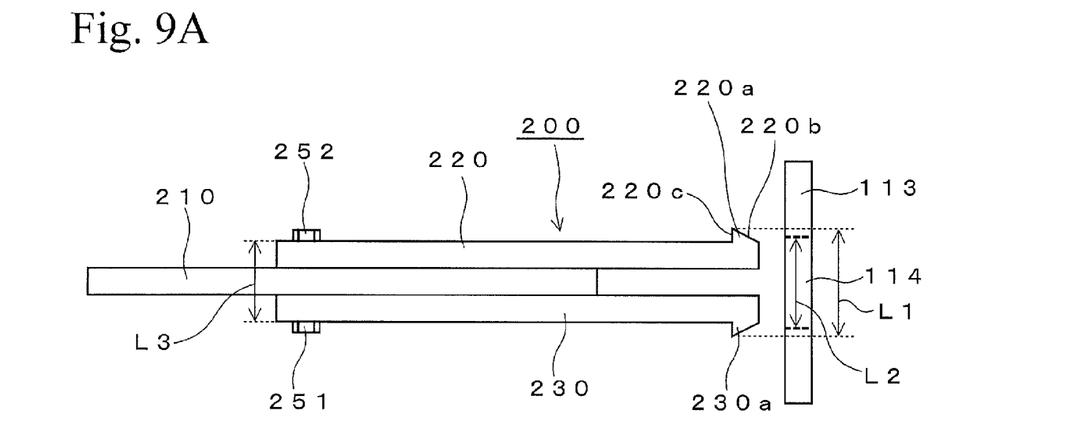
FIG. 9 is a schematic diagram showing hanging steps by which the telescopic plate with the rotation preventing plate by elastic deformation is hung.
Figure 9B:
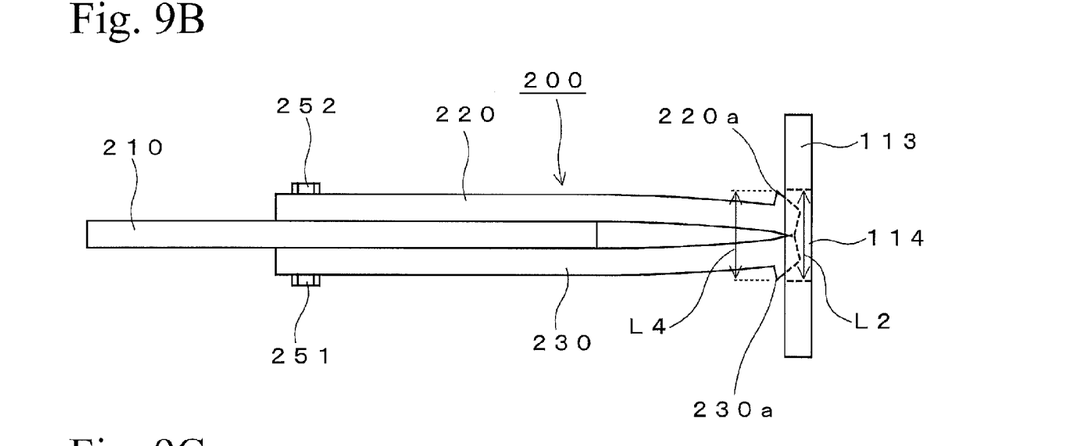

Tips of the long plate pieces 220 and 230 are pushed from the condition shown in FIG. 9A to the opening 114 of the rotation preventing plate 113. Here, right edges of the long plate pieces 220 and 230 protrude from a right edge of the long plate 210, the flange portions 220a and 230a are separated for a thickness of the long plate 210, and both sides in an inserting direction of the flange portions 220a and 230a are inclined. Therefore, when the tips of the flange portions 220a and 230a are contacted with the opening 114, the long plate pieces 220 and 230 are bent inwardly by elastic deformation, as shown in FIG. 9B. Here, when the tips of the long plate pieces 220 and 230 are further pushed in the opening 114, the condition shown in FIG. 9B can be transitioned to a condition shown in FIG. 9C, since the dimension of each portion is adjusted so that the flange portions 220a and 230a can be passed through the opening 114 in the condition shown in FIG. 9B. Then, in the condition shown in FIG. 9C, the bent long plate pieces 220 and 230 return to an original shape by their own elasticity, so that the bend is released. Here, in the conditions shown in FIG. 9C, the gap portions of the flange portions 220a and 230a are engaged with the edge of the opening 114 and the rotation preventing plate 113 can be prevented from moving in a right direction in the figure relative to the long plate pieces 220 and 230, since the dimension is set to satisfy L1>L2. In this condition, the long plate pieces 220 and 230 are slid relative to the long plate 210, and as a result, the same function as that of the second embodiment can be obtained. Here, the rotation stop function can be obtained in the same manner as those of the first embodiment and the second embodiment.

Figure 9C:
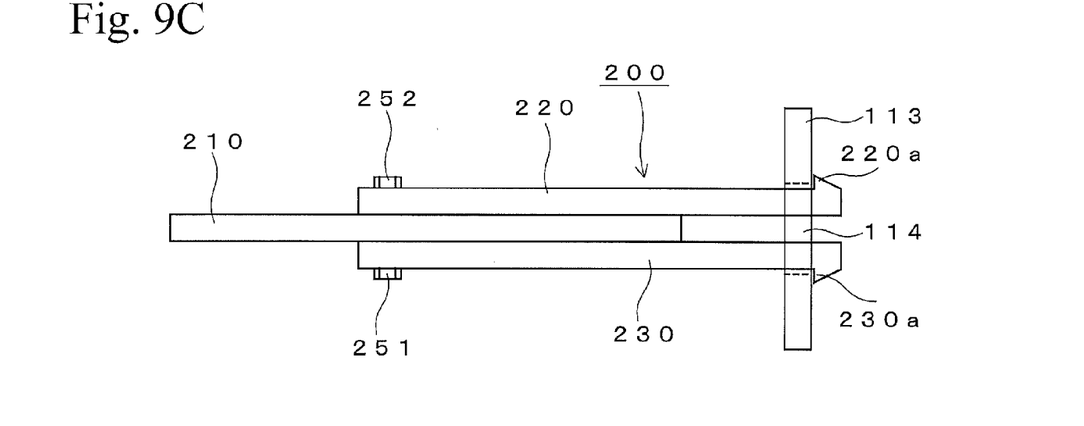

Here, the rotation preventing plate 113 can be individually detached from the long plate pieces 220 and 230 in the condition shown in FIG. 9C. That is, engaging of the long plate pieces 220 and 230 with the rotation preventing plate 113 can be individually released by carrying out the above procedure in reverse from the condition shown in FIG. 9C. In this case, fixing of the bolt 251 and the nut 252 is released, and the long plate pieces 220 and 230 are detached from the rotation preventing plate 113 by carrying out a procedure from the condition shown in FIG. 4B to the condition shown in FIG. 4A. In addition, in the condition shown in FIG. 9C, the long plate pieces 220 and 230 are bent so as to close the tips thereof, as shown in FIG. 9B, and the telescopic plate 200 can also be pulled out from the opening 114 of the rotation preventing plate 113.

Advantages

The required labor can be reduced, since the engaging of the telescopic plate 200 with the opening 114 of the rotation preventing plate 113 is carried out by only pushing the telescopic plate 200 in the opening 114 of the rotation preventing plate 113. Therefore, the production costs can be avoided.

As described above, the structure shown in FIG. 9 has an engaging portion in which the long member is engaged with a regulating member by hanging. The engaging portion has a flange portion, and it is engaged with the regulating member by hanging the flange portion with an edge of an opening formed on the regulating member. Some members that constitute the long member are arranged with clearance, and they can be elastically deformed in a direction of this clearance. Therefore, when the long members are pushed in the opening of the regulating member, the engaging portions are deformed in a direction that bring them close to each other, and whereby the engaging portions can be inserted in the opening of the regulating member. On the engaging portions passing through the opening, when members that constitute the long member return to the original shape by their own elasticity, the flange portions are engaged with an edge of the opening, and they cannot be relatively pulled from the opening of the regulating member. In this way, a process in which the long member is engaged with the regulating member can be carried out by simpler work.

Other Matters

The shape of the opening 114 is not limited to a rectangle, and it may be a shape in which the engaging portion 115a of the long plate 115 can pass through the opening 115 by the method shown in FIG. 4, and the engaging portion 115a is engaged. As an example of another shape of the opening 114, an elliptical shape, hexagon, etc., can be used. Bending angles of the bending portions 116a and 117a are limited to 90 degrees, and they may be angles of which the bending portions 116a and 117a are engaged with the edge of the opening 114. Furthermore, not only the bending structure using the engaging portion 115a but also a structure in which a protruded portion or a flange is hung at an edge of the opening 114, may be used.

The long plate 115 is not limited to a structure divided into two pieces. In addition, the long plate 115 and the telescopic plate 130 may be made from round pillar rods and square pillar rods. Though a telescopic mechanism of the telescopic plate 130 has a two stages structure, it may have a structure with three or more stages. In the above structures, a cylinder member coaxially arranged has a three-stage structure containing the outer cylinder, the middle cylinder and the inner cylinder, and it may have a two-stage structure or a structure with four or more stages. In the structure shown in FIG. 9, the long plate pieces 220 and 230 may be fixed to the long plate 210. In this case, the stroke is shorter than those of the above structures; however, the same functions as in the case shown in FIG. 1 can be obtained.

The present invention can be used for an overhead wire tension balancer.

The invention claimed is:

1. An overhead wire tension balancer, having cylinders coaxially arranged, comprising:
   a long member that extends to an inside of the innermost cylinder of the cylinders,
   a regulating member that is fixed at an end of the inside of the innermost cylinder of the cylinders, which relatively moves the long member in a longitudinal direction, regulates rotation of the long member in which the longitudinal direction is a rotational axis, and engages with the long member in a condition which prevents the long member from completely pulling out from the inside of the innermost cylinder of the cylinders, and
   a fixing member for fixing an end of the long member to the outermost cylinder of the cylinders,
   wherein the long member is formed by members that are arranged in a direction perpendicular to the longitudinal direction,
   the regulating member has a non-circular opening,
   each of the members penetrates the opening and has an engaging portion at another end thereof for engaging with the opening of the regulating member, and
   the engaging portions of the members are engaged with the opening of the regulating member respectively.

2. An overhead wire tension balancer according to claim 1, wherein the members are a pair of members in an L shape in which a tip is bent.

3. An overhead wire tension balancer according to claim 1, wherein in a condition of which the long member is engaged with the regulating member, the opening has a shape which enables to incline the end of the member such that the end separates from the other member and extracts the engaging portion from the opening, whereby the long member is divided into members, and each engaging of the members with the regulating member is released in order.

4. An overhead wire tension balancer according to claim 1, wherein the members include a first member and a pair of second members, an end of the first member is fixed to the cylinder by the fixing member, ends of the second members holding the first member are mounted to the other end of the first member, and other ends of the second member are free, the engaging is carried out by elastic deformation of the other ends of the second members so as to close each other.

5. An overhead wire tension balancer according to claim 1, wherein the members include a first member and a pair of second members, an end of the first member is fixed to the cylinder by the fixing member, ends of the second members holding the first member are mounted to the other end of the first member, the second members are connected each other by a connecting member, the first member includes a long hole in which the connecting member penetrates and moves in the longitudinal direction.

* * * * *